(12) United States Patent
Kakura

(10) Patent No.: US 8,422,437 B2
(45) Date of Patent: Apr. 16, 2013

(54) RESOURCE ASSIGNMENT METHOD FOR COMMUNICATION SYSTEM ADAPTED FOR CHANGE OF CHANNEL

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1147 days.

(21) Appl. No.: 11/908,465

(22) PCT Filed: Mar. 31, 2006

(86) PCT No.: PCT/JP2006/306840
§ 371 (c)(1),
(2), (4) Date: Sep. 12, 2007

(87) PCT Pub. No.: WO2006/106922
PCT Pub. Date: Oct. 12, 2006

(65) Prior Publication Data
US 2009/0028102 A1    Jan. 29, 2009

(30) Foreign Application Priority Data

Mar. 31, 2005 (JP) ................................. 2005-102801

(51) Int. Cl.
*H04W 4/00* (2009.01)
(52) U.S. Cl.
USPC ........... 370/329; 370/343; 370/432; 370/436; 370/437; 370/462; 370/478; 370/480
(58) Field of Classification Search .................. 370/329, 370/343, 432, 436, 437, 462, 478, 480
See application file for complete search history.

(56) References Cited

U.S. PATENT DOCUMENTS

| | | | |
|---|---|---|---|
| 2003/0142658 A1* | 7/2003 | Ofuji et al. | 370/349 |
| 2003/0232601 A1* | 12/2003 | Uno | 455/67.11 |
| 2004/0246886 A1* | 12/2004 | Mege et al. | 370/203 |
| 2005/0243939 A1* | 11/2005 | Jung et al. | 375/260 |
| 2007/0253324 A1* | 11/2007 | Ma et al. | 370/208 |
| 2007/0263734 A1* | 11/2007 | Seki | 375/259 |
| 2008/0020779 A1* | 1/2008 | Ode et al. | 455/450 |
| 2008/0291856 A1* | 11/2008 | Li et al. | 370/311 |

FOREIGN PATENT DOCUMENTS

| | | |
|---|---|---|
| JP | 2002-118533 A | 4/2002 |
| JP | 2003-304220 A | 10/2003 |
| JP | 2004-48117 A | 2/2004 |
| JP | 2004-364094 A | 12/2004 |
| JP | 2005-510315 A | 4/2005 |
| WO | WO 03/021829 A1 | 3/2003 |
| WO | WO 2004/056022 A2 | 7/2004 |

OTHER PUBLICATIONS

Japanese Office Action issued on Jun. 23, 2011 in the corresponding Japanese Patent Application No. 2007-511168.

* cited by examiner

*Primary Examiner* — Alvin Zhu
(74) *Attorney, Agent, or Firm* — Sughrue Mion, PLLC

(57) ABSTRACT

A resource assignment method for a communication system provides a method to realize an estimate of channel with high accuracy for terminals which change channels rapidly. A resource assignment unit (102), supplied with channel information $IS_{CI1}$ to $NS_{CIN}$, determines assignment of resources to a first to a Nth terminals and outputs a resource assignment information $S_{RA}$. A multiplex signal generating unit (103), supplied with the resource assignment information $S_{RA}$, outputs a transmission signal $S_{TX}$. A resource selector (104), supplied with the channel information $1S_{CI1}$ to $NS_{CIN}$ and the relative position information $S_{RP}$, determines the assignment of resources to the first to Nth terminals and outputs the resource assignment information $S_{RA}$. A resource position generating unit (105), supplied with the resource assignment information $S_{RA}$, calculates a relative position of an empty resource with respect to a multiplex position of a pilot signal and outputs the relative position information $S_{RP}$.

16 Claims, 5 Drawing Sheets

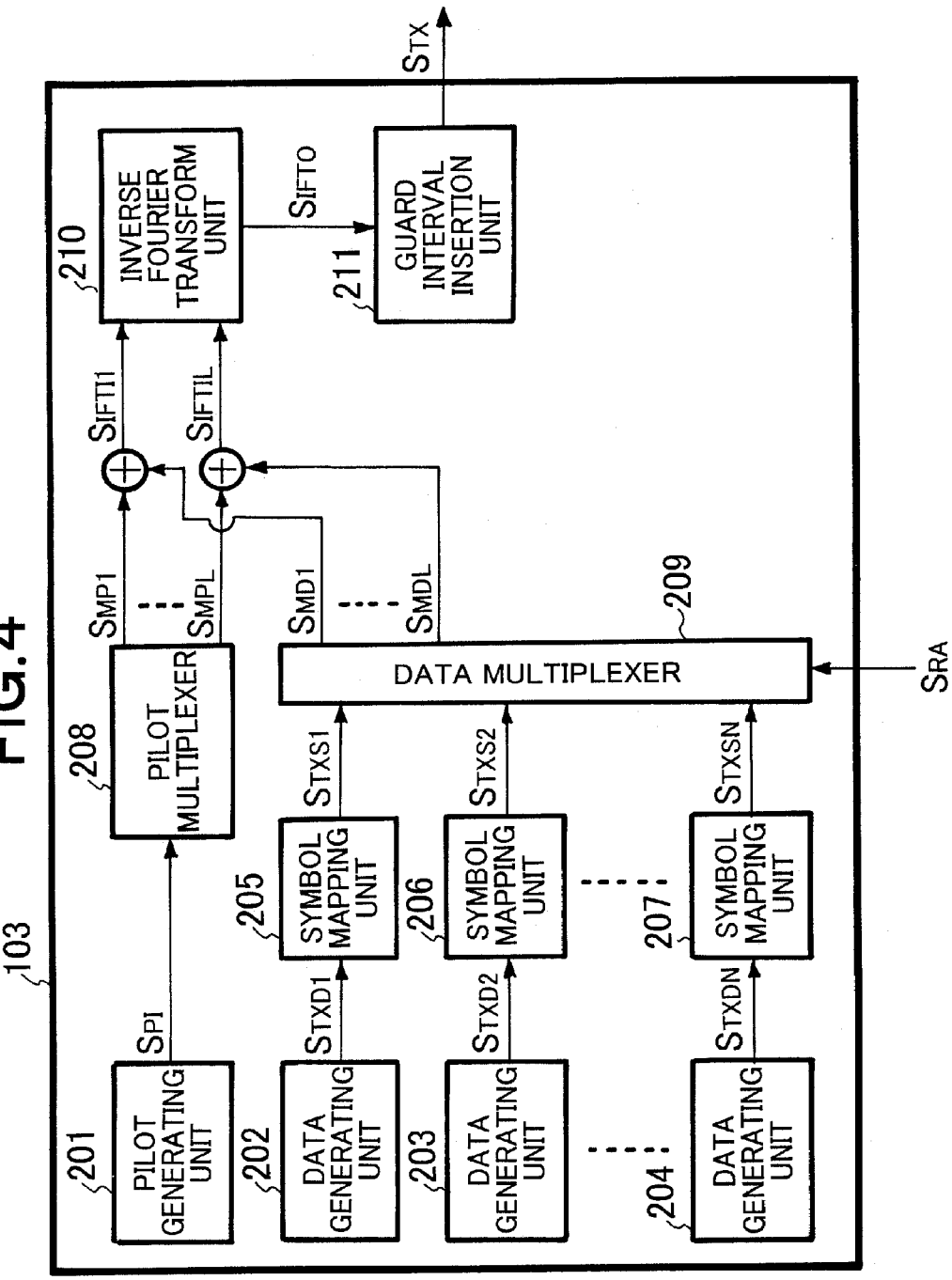

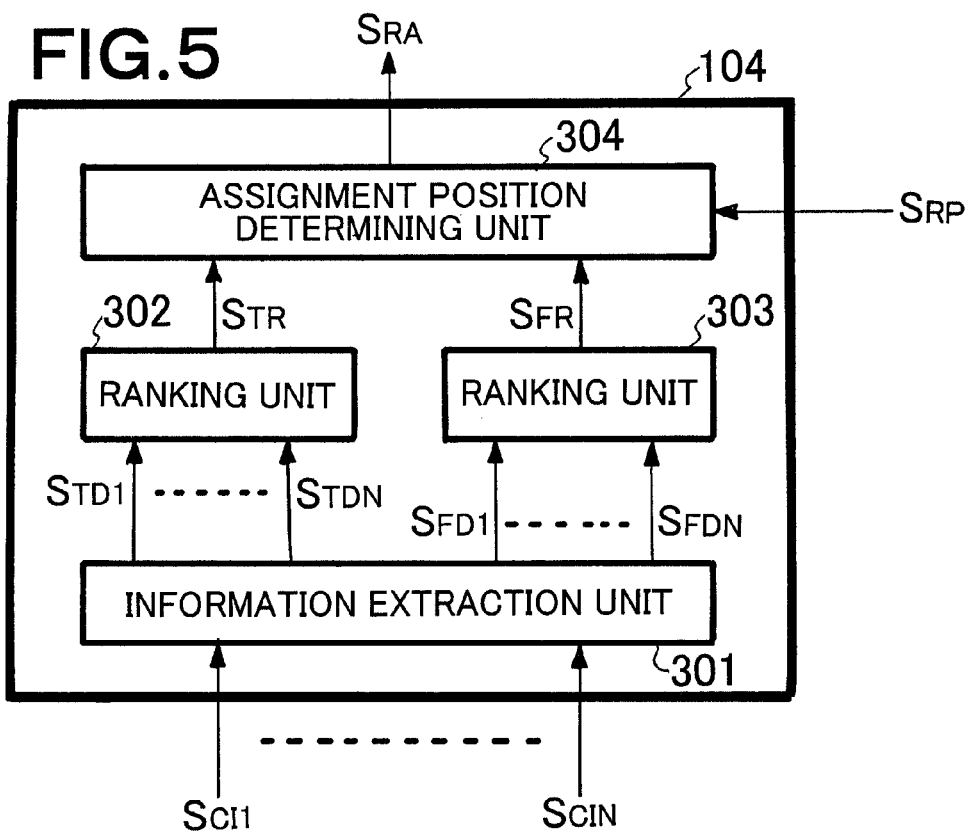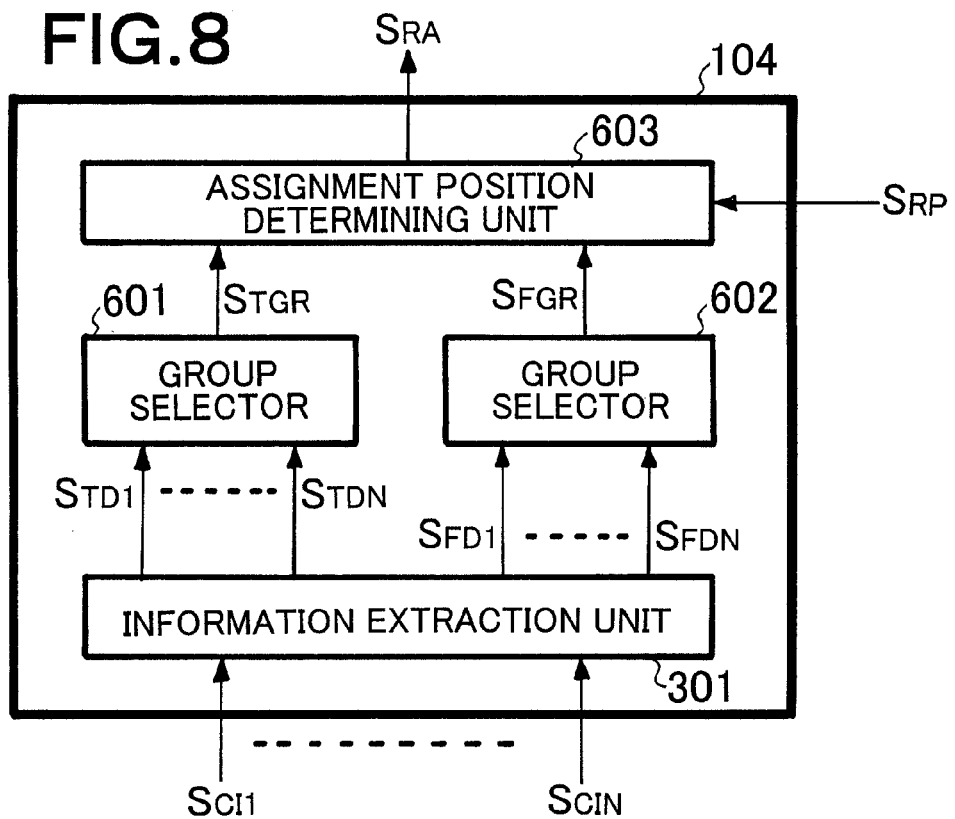

RESOURCE ASSIGNMENT METHOD FOR COMMUNICATION SYSTEM ADAPTED FOR CHANGE OF CHANNEL

This application is based upon and claims the benefit of priority from Japanese patent application No. 2005-102801, filed on Mar. 31, 2005, the disclosure of which is incorporated herein in its entirety by reference.

TECHNICAL FIELD

This invention relates to a resource assignment method for a communication system of which a communication apparatus transmits signals to a plurality of terminal units and assigns the resources adaptively based on channel information corresponding to each of the plurality of terminal units.

BACKGROUND ART

In the conventional radio communication system, a pilot signal is used as a known signal to estimate the channel. In the communication with a plurality of terminals sharing a radio resource, a method of multiplexing the pilot signal at predetermined intervals on the transmission data multiplexed for multiple users is known as a method of multiplexing the pilot signal shared and the transmission data to a plurality of terminals. An explanation is made below about the signal multiplexing method described in Technical Report TR25.892 of Standard Association 3GPP with reference to FIG. 1.

A resource assignment unit 802 determines the assignment of the radio resource to each terminal unit and outputs a resource assignment signal $S_{RA}$. A multiplex signal generating unit 103 supplied with the resource assignment signal $S_{RA}$ multiplexes the pilot data and the transmission data and outputs a transmission signal $S_{TX}$.

FIG. 4 shows an example of the configuration of the multiplex signal generating unit 103 using OFDM (Orthogonal Frequency Division Multiplexing) as a radio transmission method. OFDM is one of the radio transmission methods having a superior multipath resistance characteristic, in which the entire band is divided into a plurality of subcarriers, and by inserting guard intervals and deleting the guard intervals at the receiving end, the inter-symbol interference due to the multipath is removed.

A pilot generating unit 201 generates and outputs a pilot signal $S_{PI}$. Data generating units 202 to 204 output transmission data $S_{TXD1}$ to $S_{TXDN}$ to terminals 1 to N. Symbol mapping units 205 to 207, supplied with the transmission data $S_{TXD1}$ to $S_{TXDN}$, map the data to the transmission symbols and output transmission symbol signals $S_{TXS1}$ to $S_{TXSN}$, respectively.

A pilot multiplexer 208, supplied with the pilot signal $S_{PI}$ as an input, outputs pilot multiplex signals $S_{MP1}$ to $S_{MPL}$. The data multiplexer 209, supplied with the transmission symbol signals $S_{TXS1}$ to $S_{TXSN}$ and the resource assignment signal $S_{RA}$, multiplexes the transmission symbol signals $S_{TXS1}$ to $S_{TXSN}$ in accordance with the resource assignment signal $S_{RA}$, and outputs data multiplex signals $S_{MD1}$ to $S_{MDL}$. The pilot multiplex signals $S_{MP1}$ to $S_{MPL}$ and the data multiplex signals $S_{MD1}$ to $S_{MDL}$ are added to each other thereby to generate inverse Fourier transform unit input signals $S_{IFT1}$ to $S_{IFTN}$.

The inverse Fourier transform unit 210, supplied with the inverse Fourier transform unit input signals $S_{IFT1}$ to $S_{IFTN}$, conducts the inverse Fourier transform and outputs an inverse Fourier transform unit output signal $S_{IFTO}$. A guard interval insertion unit 211, supplied with an inverse Fourier transform unit output signal $S_{IFTO}$, inserts a guard interval and outputs a transmission signal $S_{TX}$.

With the configuration described above, as shown in FIG. 2, for example, a transmission signal with pilot signals multiplexed at predetermined intervals on time axis and frequency axis is generated. At the receiving end, the channel is estimated using the pilot signal, and the portion of the channel with no pilot signal multiplexed is estimated by linear interpolation or the like based on two points of the estimated value on the channel portion where the pilot signal is inserted.

Also, a radio transmission method is available for adaptively selecting the direction of diffusion (time axis, frequency axis) of the radio resource at the transmitting end in accordance with the channel change (see, for example, Patent Document 1).

Patent Document 1: JP-A-2003-304220

Disclosure Of The Invention

At terminals high in moving speed or in a harsh environment with multipath interference, however, the channel frequently changes on both time axis and frequency axis. In the case where a radio resource distant from the pilot signal multiplex position on time axis or frequency axis are assigned to such terminals for data communication, therefore, the resource assignment method described above poses the problem that the channel estimation accuracy at the receiving end is deteriorated. Although this accuracy can be improved by reducing the intervals at which the pilot signals are inserted, the problem of deterioration of transmission efficiency arises.

In view of the above, an object of this invention is to provide a resource assignment method for a communication system adapted to the channel change which improves the channel estimation accuracy without reducing the data transmission efficiency.

In order to solve the aforementioned problem, the radio communication apparatus according to this invention includes a resource assignment unit supplied with a first to a Nth (N: arbitrary natural number) channel information corresponding to a first to a Nth terminal units for determining the resource assignment to the first to Nth terminal units and outputting a resource assignment signal, and a multiplex signal generating unit supplied with the resource assignment signal for multiplexing the pilot signal and the transmission data and outputting a transmission signal. The radio communication apparatus detects a change of channel of each terminal unit and assigns preferentially a resource nearby a multiplex position of a pilot signal to the terminal unit making a larger change of propagation.

With this configuration, estimation accuracy of the channel is improved without causing deterioration of the data transmission efficiency.

Effect Of The Invention

This invention, with the configuration and the operation described below, produces the effect of improving the channel estimation accuracy without reducing the data transmission efficiency.

BRIEF DESCRIPTION OF THE DRAWINGS

FIG. 4 is a diagram showing the configuration of the multiplex signal generating unit based on 3GPP.TR25, 892;

FIG. 5 is a diagram showing the configuration of the resource selector according to a first embodiment;

FIG. 8 is a diagram showing the configuration of the resource selector according to the second embodiment.

Figure 1:
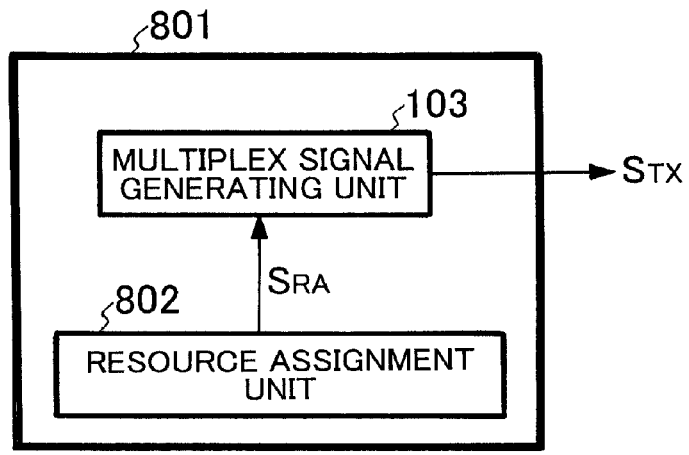
FIG. 1 is a diagram showing the configuration of a radio communication apparatus based on 3GPP.TR25, 892.
Figure 2:
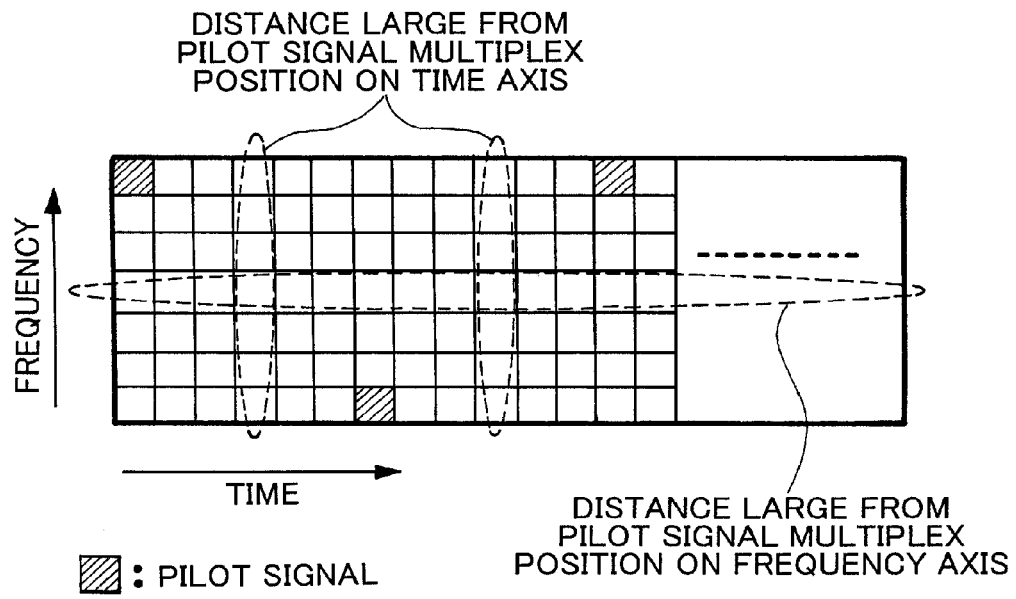
FIG. 2 is a diagram for explaining the transmission signal based on 3GPP.TR25, 892.

DESCRIPTION OF REFERENCE NUMERALS 101, 801 Radio communication apparatus
102, 802 Resource assignment unit
103 Multiplex signal generating unit
104 Resource selector
105 Resource position generating unit
201 Pilot generating unit
202, 203, 204 Data generating unit
205, 206, 207 Symbol mapping unit
208 Pilot multiplexer
209 Data multiplexer
210 Inverse Fourier transform unit
211 Guard interval insertion unit
301 Information extraction unit
302, 303 Ranking unit
304, 603 Assignment position determining unit
601, 602 Group selector Best Mode For Carrying Out The Invention The best mode for carrying out the invention is explained with reference to the drawings.

Figure 3:
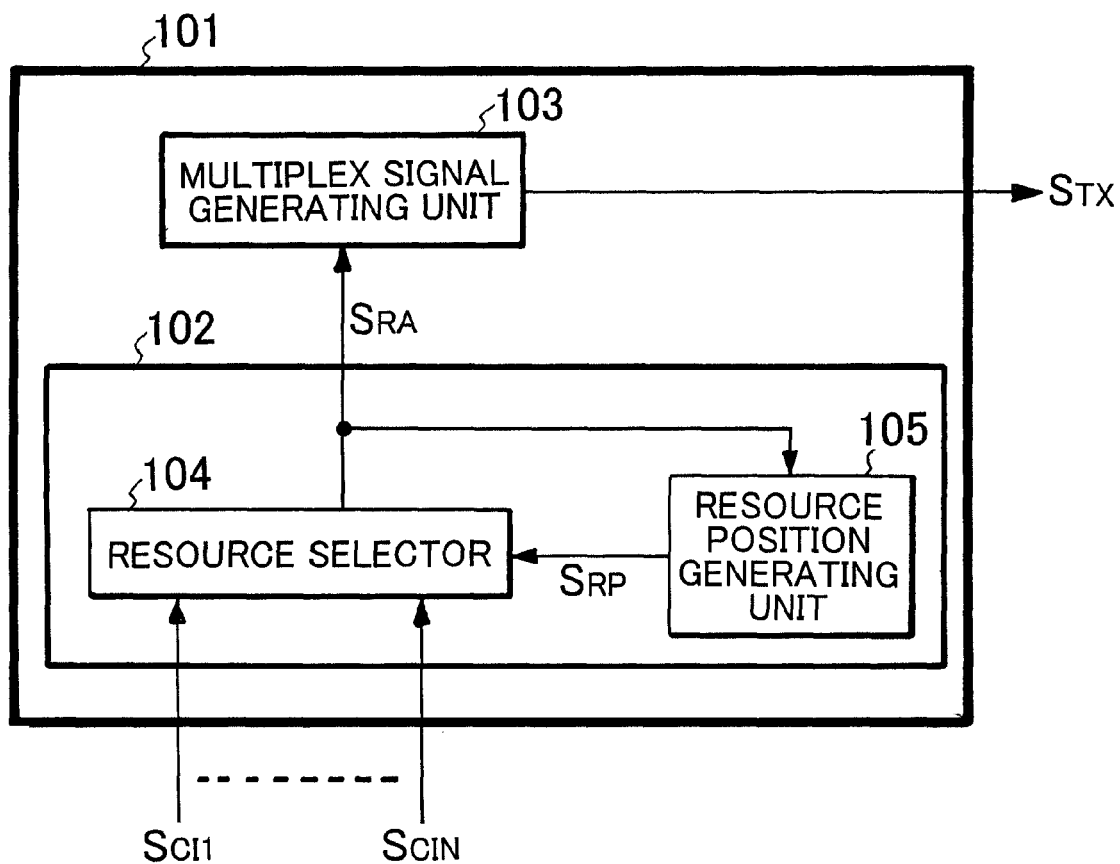
FIG. 3 is a diagram showing the configuration of a radio communication apparatus according to the best mode for carrying out the invention.

FIG. 3 is a block diagram showing a radio communication apparatus according to the best mode for carrying out the invention. A resource assignment unit 102, supplied with channel information $1S_{CI1}$ to $NS_{CIN}$, determines the resource assignment to the first to Nth terminals and outputs the resource assignment information $S_{RA}$. A multiplex signal generating unit 103, supplied with the resource assignment signal $S_{RA}$, outputs a transmission signal $S_{TX}$. The resource assignment unit 102 includes a resource selector 104 which, supplied with the channel information $1S_{CI1}$ to $NS_{CIN}$ and the relative position information $S_{RP}$, determines the resource assignment to the first to Nth terminals and outputs the resource assignment information $S_{RP}$, and a resource position generating unit 105 which, supplied with the resource assignment information $S_{RA}$, calculates the position of the empty resources relative to the pilot signal multiplex position and outputs the relative position information $S_{RP}$.

With the configuration described above, the resource selector 104 assigns the resource near the pilot signal multiplex position preferentially to a terminal unit having a large propagation change, so that the channel estimation accuracy can be improved without reducing the data transmission efficiency.
(Embodiment 1)

FIGS. 4 and 5 are block diagrams showing the configuration of the multiplex signal generating unit 103 and the resource selector 104 according to a first embodiment of the invention. FIG. 4 shows the configuration using OFDM as the transmission method described above with reference to the background art.

In FIG. 5, an information extraction unit 301, supplied with the channel information $1S_{CI1}$ to $NS_{CIN}$, extracts the change amount of the channel of the first to Nth terminals on time and frequency axes, and outputs the time change information $1S_{TD1}$ to $NS_{TDN}$ and the frequency change information $1S_{FD1}$ to $NS_{FDN}$, respectively. The ranking units 302, 303, supplied with the time change information $1S_{TD1}$ to $NS_{TDN}$ and the frequency change information $1S_{FD1}$ to $NS_{FDN}$, rearrange them in the order of magnitude of the change amount and output the ranking of the change in the first to Nth terminals with time and frequency as time ranking information $S_{TR}$ and frequency ranking information $S_{FR}$, respectively. The assignment position determining unit 304, supplied with the time ranking information $S_{TR}$, the frequency ranking information $S_{FR}$ and the relative position information $S_{RP}$, determines the resource assignment to the first to Nth terminals and outputs the resource assignment information $S_{RA}$.

Figure 6:
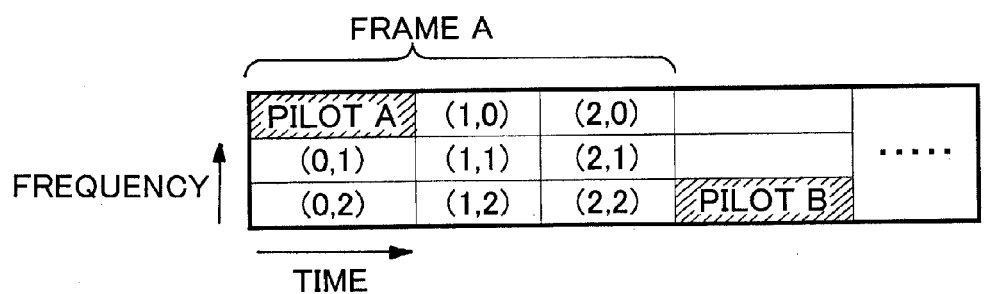
FIG. 6 is a diagram for explaining the signal format according to first and second embodiments.

Consider, for example, a case in which the channel is estimated based on the signal format shown in FIG. 6 while using the pilot signal A for the terminal assigned the radio resource of the frame A.

In FIG. 6, the relative position information $S_{RA}$ of each resource of the area A is defined as S (=the relative position to the pilot signal A on time axis and the relative position to the pilot signal A on frequency axis). Assume that N=5 and the radio resource in the area A is assigned to five terminals.

Assume that the channel information $1S_{CI1}$ to $5S_{CI5}$ are configured as ($f_d$, $\tau$) from the Doppler frequency $f_d$ and the delay dispersion $\tau$, and $S_{CI1}$=(1 Hz, 1 μsec)
$S_{CI2}$=(500 Hz, 0.1 μsec)
$S_{CI3}$=(1 Hz, 5 μsec)
$S_{CI4}$=(10 Hz, 0.2 μsec)
$S_{CI5}$=(200 Hz, 3 μsec)

In the case where the coherent time $t_{coh}$ (=$1/(2f_d)$) at which the channel can be regarded as constant is used as a change with time and the coherent band $B_{coh}$ (=$1/(2\pi\tau)$) making up a bandwidth at which the channel can be regarded as constant as a change with frequency, then the time change information $1S_{TD1}$ to $NS_{TDN}$, the frequency change information $1S_{FD1}$ to $NS_{FDN}$ are given as follows:

$S_{TD1}$=500 msec, $S_{FD1}$=160 kHz
$S_{TD2}$=1 msec, $S_{FD2}$=1600 kHz
$S_{TD3}$=0.5 msec, $S_{FD3}$=32 kHz
$S_{TD4}$=50 msec, $S_{FD4}$=800 kHz
$S_{TD5}$=2.5 msec, $S_{FD5}$=53 kHz In the above-mentioned case, the smaller the numerical value, the larger the change amount of the channel. The ranking is made based on the change amount, by arranging the terminal numbers in the descending order of the change amount, the time ranking information $S_{TR}$ and the frequency ranking information $S_{FR}$ described below are obtained.

$S_{TR}$=(3, 2, 5, 4, 1)
$S_{FR}$=(3, 5, 1, 4, 2)

Figure 7:
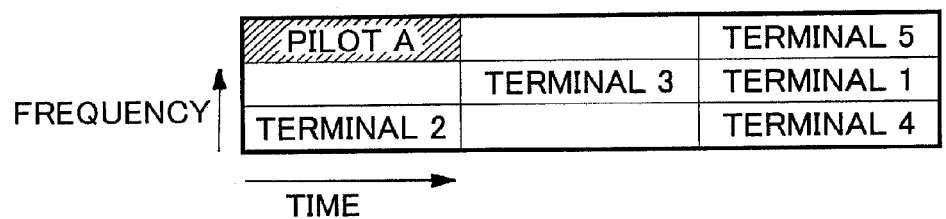
FIG. 7 is a diagram showing the configuration for explaining the resource assignment according to the first embodiment.

Using this information, the resource assignment is determined by the assignment position determining unit 304. The terminal 3 having a large change with both time and frequency is assigned a resource having a small relative position on both time and frequency axes, the terminal 2 having a large change only with time is assigned a resource having a small relative position only on time axis, and the terminal 5 having a large change only with frequency is assigned a resource having a small relative position only on frequency axis. In the process, for example, the resources are assigned as shown in FIG. 7.

In the way described above, the channel estimation accuracy for the terminals having a large channel change is improved.

(Embodiment 2)

FIG. 8 is a diagram showing a resource selector 104 according to a second embodiment of the invention. The multiplex signal generating unit 103 has the configuration shown in FIG. 4 like the first embodiment.

In FIG. 8, an information extraction unit 301, supplied with the channel information $1S_{CI1}$ to $NS_{CIN}$, extracts the change amount at the first to Nth terminals on time and frequency axes on the channel and outputs the time change information $1S_{TD1}$ to $NS_{TDN}$ and the frequency change information $1S_{FD1}$ to $NS_{FDN}$, respectively.

Group selectors 601, 602, supplied with the time change information $1S_{TD1}$ to $NS_{TDN}$ and the frequency change information $1S_{FD1}$ to $NS_{FDN}$, respectively, divide the first to Nth terminals into M groups in accordance with the time change information $1S_{TD1}$ to $NS_{TDN}$ and K groups in accordance with the frequency change information $1S_{FD1}$ to $NS_{FDN}$, and output the time group information $S_{TGR}$ and the frequency group information $S_{FGR}$, respectively.

The assignment position determining unit 603, supplied with the time group information $S_{TGR}$, the frequency group information $S_{FGR}$ and the relative position information $S_{RP}$, determines the resource assignment to the first to Nth terminals and outputs the resource assignment information $S_{RA}$.

Consider, for example, a case in which like in the first embodiment, the channel is estimated based on the signal format shown in FIG. 6 and using the pilot signal A for the terminal assigned the radio resource of the frame A.

Assume that N is 5 and the radio resource of the area A is assigned to the five terminals. Also, assume that the channel information $1S_{CI1}$ to $5S_{CI5}$ are configured as $(f_d, \tau)$ from the Doppler frequency $f_d$ and the delay dispersion $\tau$, and $S_{CI1}$=(1 kHz, 5 μsec)
$S_{CI2}$=(50 Hz, 1 μsec)
$S_{CI3}$=(10 Hz, 2.5 μsec)
$S_{CI4}$=(2 kHz, 0.5 μsec)
$S_{CI5}$=(5 Hz, 0.25 μsec)

In the case where the coherent time $t_{coh}$ (=1/(2$f_d$)) at which the channel can be regarded as constant is used as a change with time and the coherent band $B_{coh}$ (=1/(2πτ)) making up a bandwidth at which the channel can be regarded as constant as a change with frequency, then the time change information $1S_{TD1}$ to $NS_{TDN}$, the frequency change information $1S_{FD1}$ to $NS_{FDN}$ are given as follows:

$S_{TD1}$=0.5 msec, $S_{FD1}$=32 kHz
$S_{TD2}$=10 msec, $S_{FD2}$=160 kHz
$S_{TD3}$=50 msec, $S_{FD3}$=64 kHz
$S_{TD4}$=0.25 msec, $S_{FD4}$=320 kHz
$S_{TD5}$=100 msec, $S_{FD5}$=640 kHz In the above-mentioned case, the smaller the numerical value, the larger the change amount of the channel. Assume that M=2 and K=2, i.e. the terminals are divided into two groups according to the change with time, and two groups according to the change with frequency.

Assume that the terminals having the time change information of less than 1 msec as time group 1, the terminals having the time change information of 1 msec or more as time group 2, the terminals having the frequency change information of less than 100 kHz as frequency group 1, and the terminals having the frequency change information of 100 kHz or more as frequency group 2. By arranging the group numbers in the order of terminal number, the time group information $S_{TGR}$ and the frequency group information $S_{FGR}$ described below are obtained.

$S_{TGR}$=(1, 2, 2, 1, 2)
$S_{FGR}$=(1, 2, 1, 2, 2)

Figure 9:
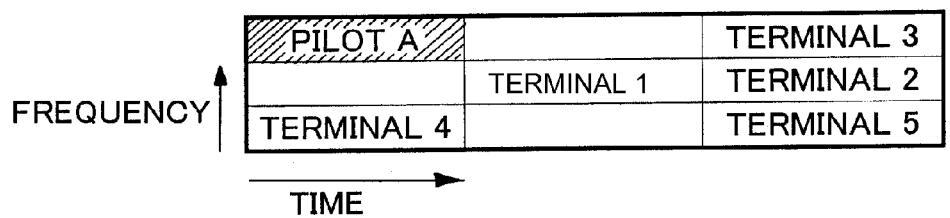
FIG. 9 is a diagram showing the configuration for explaining the resource assignment according to the second embodiment.

Using this information, the resource assignment is determined by the assignment position determining unit 603. The terminal 1 having a large change with both time and frequency is assigned a resource having a small relative position on both time and frequency axes, the terminal 4 having a large change only with time is assigned a resource having a small relative position only on time axis, and the terminal 3 having a large change only with frequency is assigned a resource having a small relative position only on frequency axis. In the process, for example, the resources are assigned as shown in FIG. 9.

In the way described above, the propagation estimation accuracy at the terminals having a large channel change can be improved.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

The invention claimed is:

1. A radio communication apparatus transmitting signals to a first to a Nth (N: arbitrary natural number) terminal units, the apparatus comprising:
    a resource assignment unit assigning resources to the first to Nth terminal units based on channel changes extracted from a first to a Nth channel information corresponding to the first to Nth terminal units, respectively; and
    a multiplex signal generating unit multiplexing a pilot signal and transmission data and generating a transmission signal based on said assignment of resources determined by the resource assignment unit,
    the resource assignment unit assigning the resources so that a resource assigned to one of the first to Nth terminal units is nearer to a multiplex position of the pilot signal than a resource assigned to another of the first to Nth terminal units if a channel change on the one of the first to Nth terminal units is larger than a channel change on the another of the first to Nth terminal units, and assigning the resources so that a resource assigned to one of the first to Nth terminal units is farther from a multiplex position of the pilot signal than a resource assigned to another of the first to Nth terminal units if a channel change on the one of the first to Nth terminal units is smaller than a channel change on the another of the first to Nth terminal units.

2. The radio communication apparatus of claim 1, wherein the multiplex position is a multiplex position of the pilot signal on a time axis, and the channel changes are channel changes on the time axis.

3. The radio communication apparatus of claim 1, wherein the multiplex position is a multiplex position of the pilot signal on a time axis, and the channel changes are channel changes on the time axis, and
    wherein the resource assignment unit assigns so that a resource assigned to one of the first to Nth terminal units is nearer to a multiplex position of a pilot signal on a frequency axis than a resource assigned to another of the first to Nth terminal units if a channel change on the one of the first to Nth terminal units is larger than a channel change on the frequency axis on the another of the first to Nth terminal units.

4. The radio communication apparatus of any one of claims 1 to 3, wherein the resource assignment unit comprises:
   a resource position generating unit generating relative position information indicating a relative distance of an empty resource with respect to the pilot signal based on an empty resource information; and
   an assignment determining unit determining a resource assignment based on the relative position information and the first to the Nth channel information.

5. The radio communication apparatus of claim 4, wherein the assignment determining unit comprises:
   a time change extraction unit extracting a first to a Nth time change information indicating a channel change on a time axis based on the first to Nth channel information;
   a ranking unit rearranging the first to Nth time change information based on a magnitude of the change amount and generating ranking information; and
   an assignment position determining unit determining a position of the resource assignment based on the relative position information and the ranking information.

6. The radio communication apparatus of claim 4, wherein the assignment determining unit comprises:
   a time change extraction unit extracting a first to a Nth time change information indicating a channel change on a time axis based on the first to Nth channel information;
   a group classifying unit classifying the first to Nth time change information into M (M: arbitrary natural number) groups based on a magnitude of the change amount and generating a grouping information; and
   an assignment position determining unit determining a position of the resource assignment based on the relative position information and the grouping information.

7. The radio communication apparatus of claim 4, wherein the assignment determining unit comprises:
   a time/frequency change extraction unit extracting, based on the first to Nth channel information, a first to a Nth time change information indicating a channel change on a time axis and a first to a Nth frequency change information indicating a channel change on a frequency axis;
   a first ranking unit rearranging the first to the Nth time change information based on a magnitude of the change amount and generating a time change ranking information;
   a second ranking unit rearranging the first to the Nth frequency change information based on a magnitude of the change amount and generating a frequency change ranking information; and
   an assignment position determining unit determining a position of the resource assignment based on the relative position information, the time change ranking information and the frequency change ranking information.

8. The radio communication apparatus of claim 4, wherein the assignment determining unit comprises:
   a time/frequency change extraction unit extracting, based on the first to Nth channel information, a first to a Nth time change information indicating a channel change on a time axis and a first to a Nth frequency change information indicating a channel change on a frequency axis;
   a first group classifying unit classifying the first to the Nth time change information into M (M: arbitrary natural number) groups based on a magnitude of the change amount and generating a time change grouping information;
   a second group classifying unit classifying the first to the Nth frequency change information into K (K: arbitrary natural number) groups based on a magnitude of the change amount and generating a frequency change grouping information; and
   an assignment position determining unit determining a resource assignment position based on the relative position information, the time change grouping information and the frequency change grouping information.

9. A method of resource assignment for a communication system of which a communication apparatus transmitting signals to a first to a Nth (N: arbitrary natural number) terminal units assigns resources to the first to the Nth terminal units based on channel changes extracted from a first to a Nth channel information corresponding to the first to the Nth terminal units, respectively, the method including:
   a first process assigning resources to the first to Nth terminal units based on the channel changes extracted from the first to the Nth channel information corresponding to the first to Nth terminal units; and
   a second process multiplexing a pilot signal and transmission data and generating a transmission signal based on said assignment of resources determined by the first process,
   the resources being assigned so that a resource assigned to one of the first to Nth terminal units is nearer to a multiplex position of the pilot signal than a resource assigned to another of the first to Nth terminal units if a channel change on the one of the first to Nth terminal units is larger than a channel change on the another of the first to Nth terminal units, and so that a resource assigned to one of the first to Nth terminal units is farther from a multiplex position of the pilot signal than a resource assigned to another of the first to Nth terminal units if a channel change on the one of the first to Nth terminal units is smaller than a channel change on the another of the first to Nth terminal units.

10. The resource assignment method for the communication system of claim 9, wherein the multiplex position is a multiplex position of the pilot signal on a time axis, and the channel changes are channel changes on the time axis.

11. The resource assignment method for the communication system of claim 9, wherein the multiplex position is a multiplex position of the pilot signal on a time axis and the channel changes are channel changes on the time axis, and
   wherein the first process includes assigning so that a resource assigned to one of the first to Nth terminal units is nearer to a multiplex position of a pilot signal on a frequency axis than a resource assigned to another of the first to Nth terminal units if a channel change on the frequency axis on the one of the first to Nth terminal units is larger than a channel change on the frequency axis on the another of the first to Nth terminal units.

12. The resource assignment method for the communication system of any one of claims 9 to 11, wherein the first process includes:
   a third process generating relative position information indicating a relative distance of an empty resource with respect to the pilot signal based on an empty resource information; and
   a fourth process determining a resource assignment based on the relative position information and the first to the Nth channel information.

13. The resource assignment method for the communication system of claim 12, wherein the fourth process includes:
   a process extracting a first to a Nth time change information indicating a channel change on a time axis based on the first to Nth channel information;

a process rearranging the first to Nth time change information based on a magnitude of the change amount and generating ranking information; and a process determining a position of the resource assignment based on the relative position information and the ranking information.

14. The resource assignment method for the communication system of claim 12, wherein the fourth process includes:

a process extracting a first to a Nth time change information indicating a channel change on a time axis based on the first to Nth channel information;

a process classifying the first to Nth time change information into M (M: arbitrary natural number) groups based on a magnitude of the change amount and generating a grouping information; and a process determining a position of the resource assignment based on the relative position information and the grouping information.

15. The resource assignment method for the communication system of claim 12, wherein the fourth process includes:

a process extracting, based on the first to Nth channel information, a first to a Nth time change information indicating a channel change on a time axis and a first to a Nth frequency change information indicating a channel change on a frequency axis;

a process rearranging the first to the Nth time change information based on a magnitude of the change amount and generating a time change ranking information;

a process rearranging the first to the Nth frequency change information based on a magnitude of the change amount and generating a frequency change ranking information; and a process determining a position of the resource assignment based on the relative position information, the time change ranking information and the frequency change ranking information.

16. The resource assignment method for the communication system of claim 12, wherein the fourth process includes:

a process extracting, based on the first to Nth channel information, a first to a Nth time change information indicating a channel change on a time axis and a first to a Nth frequency change information indicating a channel change on a frequency axis;

a process classifying the first to the Nth time change information into M (M: arbitrary natural number) groups based on a magnitude of the change amount and generating a time change grouping information;

a process classifying the first to the Nth frequency change information into K (K: arbitrary natural number) groups based on a magnitude of the change amount and generating a frequency change grouping information; and a process determining a resource assignment position based on the relative position information, the time change grouping information and the frequency change grouping information.

* * * * *